United States Patent
Yamaguchi et al.

(10) Patent No.: US 7,613,318 B2
(45) Date of Patent: Nov. 3, 2009

(54) IMAGE PROCESSING APPARATUS, IMAGE PROCESSING METHOD, AND PRINT PRODUCT

(75) Inventors: Takashi Yamaguchi, Kawasaki (JP); Shinya Tokuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 742 days.

(21) Appl. No.: 11/337,002

(22) Filed: Jan. 23, 2006

(65) Prior Publication Data
US 2006/0165257 A1 Jul. 27, 2006

(30) Foreign Application Priority Data
Jan. 24, 2005 (JP) .............. 2005-015627

(51) Int. Cl.
*G06K 9/00* (2006.01)
(52) U.S. Cl. ..................... 382/100
(58) Field of Classification Search .......... 382/100
See application file for complete search history.

(56) References Cited

U.S. PATENT DOCUMENTS

| 6,438,251 | B1 | 8/2002 | Yamaguchi |
| 6,724,921 | B2 | 4/2004 | Yamaguchi |
| 6,885,755 | B2 | 4/2005 | Yamaguchi |
| 2002/0054680 | A1* | 5/2002 | Huang et al. ............ 380/54 |
| 2005/0134622 | A1 | 6/2005 | Yamaguchi et al. |

FOREIGN PATENT DOCUMENTS

| EP | 0 858 056 A2 | 8/1993 |
| EP | 1 416 440 A2 | 5/2004 |
| JP | 09-248935 | 9/1997 |
| JP | 2840825 B2 | 10/1998 |
| JP | 11-355554 | 12/1999 |
| JP | 2001-268346 | 9/2001 |

OTHER PUBLICATIONS

European Search Report dated Apr. 24, 2006 for Appln. No. 06001338.0-2202.

* cited by examiner

*Primary Examiner*—Tom Y Lu
(74) *Attorney, Agent, or Firm*—Pillsbury Winthrop Shaw Pittman, LLP

(57) ABSTRACT

An image processing apparatus determines an embedding method for embedding sub information into a main image to be printed on a recording layer based on the degree of optical shielding of a protection layer or a security layer formed on the surface of the recording layer, on which an image is to be printed, with respect to the surface of the recording layer in a recording medium, and generates a composite image obtained by embedding the sub information into the main image by the determined embedding method as the image to be printed on the recording layer of the recording medium.

6 Claims, 8 Drawing Sheets

404

| NO. | Coordinate value (x, y) | Degree of optical shielding C |
|---|---|---|
| 1 | (0,0) | 20% |
| 2 | (0,1) | 20% |
| 3 | (0,2) | 20% |
| ... | ... | ... |
| 34 | (3,2) | 40% |
| ... | ... | ... |
| i | (i,j) | C(i,j)% |
| ... | ... | ... |
| 134 | (16,7) | 20% |
| 135 | (16,8) | 20% |

| Degree of optical shielding C | Embedding strength rank | Embedding color difference amount |
|---|---|---|
| 0 (inclusive)~10%(exclusive) | A (Low) | R/G/B=−30/+30/−30 |
| 10 (inclusive)~20%(exclusive) | B | R/G/B=−35/+35/−35 |
| 20 (inclusive)~30%(exclusive) | C | R/G/B=−40/+40/−40 |
| 30 (inclusive)~40%(exclusive) | D | R/G/B=−45/+45/−45 |
| 40 (inclusive)~50%(exclusive) | E | R/G/B=−50/+50/−50 |
| 50 (inclusive)~60%(exclusive) | F | R/G/B=−55/+55/−55 |
| 60 (inclusive)~70%(exclusive) | G | R/G/B=−60/+60/−60 |
| 70 (inclusive)~80%(exclusive) | H (High) | R/G/B=−65/+65/−65 |
| 80 (inclusive)~100% | (NG) | (NG) |

FIG. 8

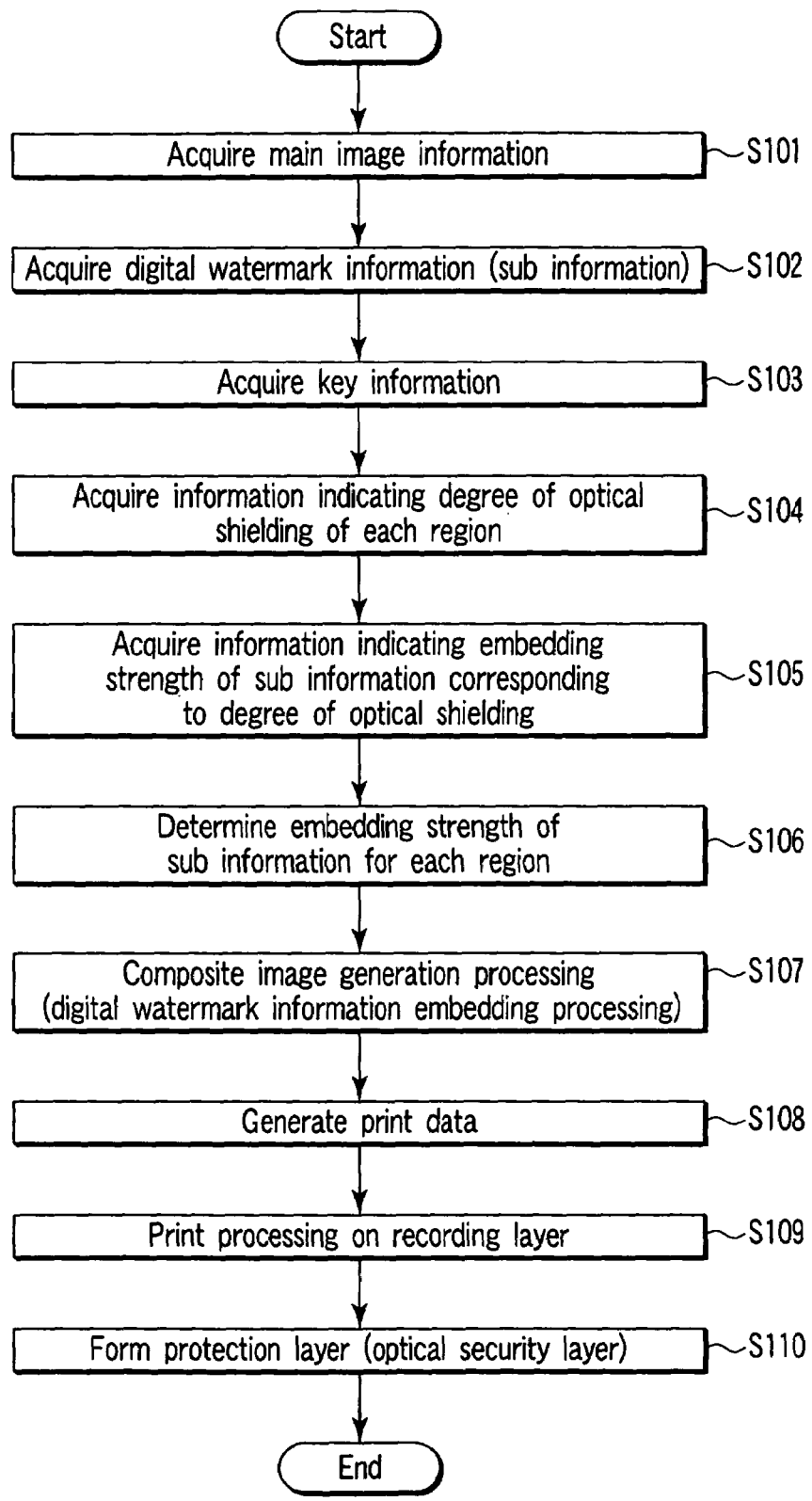
F I G. 10

| Degree of optical shielding C | Embedding position rank |
|---|---|
| 0 (inclusive)~10%(exclusive) | A (Desirable) |
| 10 (inclusive)~20%(exclusive) | B |
| 20 (inclusive)~30%(exclusive) | C |
| 30 (inclusive)~40%(exclusive) | D |
| 40 (inclusive)~50%(exclusive) | E |
| 50 (inclusive)~60%(exclusive) | F |
| 60 (inclusive)~70%(exclusive) | G |
| 70 (inclusive)~80%(exclusive) | H (Avoid) |
| 80 (inclusive)~100% | (NG) |

F I G. 12

IMAGE PROCESSING APPARATUS, IMAGE PROCESSING METHOD, AND PRINT PRODUCT

CROSS-REFERENCE TO RELATED APPLICATIONS

This application is based upon and claims the benefit of priority from prior Japanese Patent Application No. 2005-015627, filed Jan. 24, 2005, the entire contents of which are incorporated herein by reference.

BACKGROUND OF THE INVENTION

1. Field of the Invention

The present invention relates to an image processing apparatus and image processing method, which generate a composite image obtained by embedding additional sub information such as security information, which is different from a main image, into the main image such as a face image of a person, an image printed on a recording medium, and a print product on which a composite image generated by the image processing apparatus or image processing method is printed.

2. Description of the Related Art

In recent years, various security techniques are applied to ID cards (personal authentication media) such as various licenses, credit cards, membership cards, and the like.

As one security technique (first security technique) to be applied to such ID cards, for example, Japanese Patent No. 2,840,825 describes a technique for forming a hologram film on an image display medium (recording medium) to attain copy protection.

As another security technique (second security technique) to be applied to the ID cards, a digital watermark technique is known. This digital watermark technique is a technique for generating a composite image by embedding additional sub information into a main image. Such digital watermark technique is used as the security technique for preventing counterfeiting, falsification, or the like ID cards. For example, the digital watermark technique is applied to an image such as a face image printed on each ID card.

Furthermore, as the above digital watermark technique, for example, Jpn. Pat. Appln. KOKAI Publication No. 9-248935 discloses a technique for embedding sub information which is invisible to the human eye into a to-be-embedded image (main image) by exploiting high spatial frequency components and color difference components which are not perceptible by the human. Also, Jpn. Pat. Appln. KOKAI Publication No. 11-355554 discloses a technique for varying the embedding strength of a digital watermark depending on the contents of a to-be-embedded image (main image). Furthermore, Jpn. Pat. Appln. KOKAI Publication No. 2001-268346 discloses a printing apparatus used to print, on a recording medium, a composite image in a state wherein sub information is visible to the human eye using an optical filter.

However, when a hologram film is further formed on a recording medium on which a composite image generated by the digital watermark technique is printed, an optical scanning device such as a scanner, camera, or the like can hardly scan an image of a region where the hologram film is formed of the composite image printed on the recording medium. For this reason, when the hologram film is formed on the recording medium on which the composite image is printed, it becomes difficult to reconstruct sub information embedded in the composite image which is printed on the recording medium.

BRIEF SUMMARY OF THE INVENTION

An embodiment of the present invention has as its object to provide an image processing apparatus and image processing method, which can generate a composite image from which digital watermark information can be stably reconstructed even when the composite image is printed on a recording medium, and a print product on which the composite image is printed.

An image processing apparatus according to an embodiment of the present invention is an apparatus for generating an image to be printed on a recording medium, comprising a determination unit which determines an embedding method for embedding sub information into a main image to be printed on a print surface based on a degree of optical shielding of a member formed on the print surface, on which an image is to be formed, with respect to the print surface in the recording medium, and an image processing unit which generates a composite image obtained by embedding the sub information into the main image by the embedding method determined by the determination unit.

An image processing method according to an embodiment of the present invention is a method for generating an image to be printed on a recording medium, comprising determining an embedding method for embedding sub information into a main image to be printed on a print surface based on a degree of optical shielding of a member formed on the print surface, on which an image is to be formed, with respect to the print surface in the recording medium, and generating a composite image obtained by embedding the sub information into the main image by the determined embedding method.

A print product according to an embodiment of the present invention, comprises a first layer having a degree of optical shielding, and a second layer on a surface of which a composite image obtained by embedding sub information into a main image by an embedding method corresponding to the degree of optical shielding of the first layer is printed, and the first layer is formed.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 shows an example of information indicating the distribution of the degrees of optical shielding shown in FIG. 6;

FIG. 8 shows an example of information indicating the embedding strengths of digital watermark information with respect to the degrees of optical shielding;

FIG. 10 is a flowchart for explaining an example of processing according to the first embodiment;

FIG. 12 shows an example of information indicating priority levels as embedding positions of digital watermark information with respect to the degree of optical shielding.

DETAILED DESCRIPTION OF THE INVENTION

The first and second embodiments of the present invention will be described hereinafter with reference to the accompanying drawings.

An ID card as a print product according to the first and second embodiments will be described first.

Figure 1:
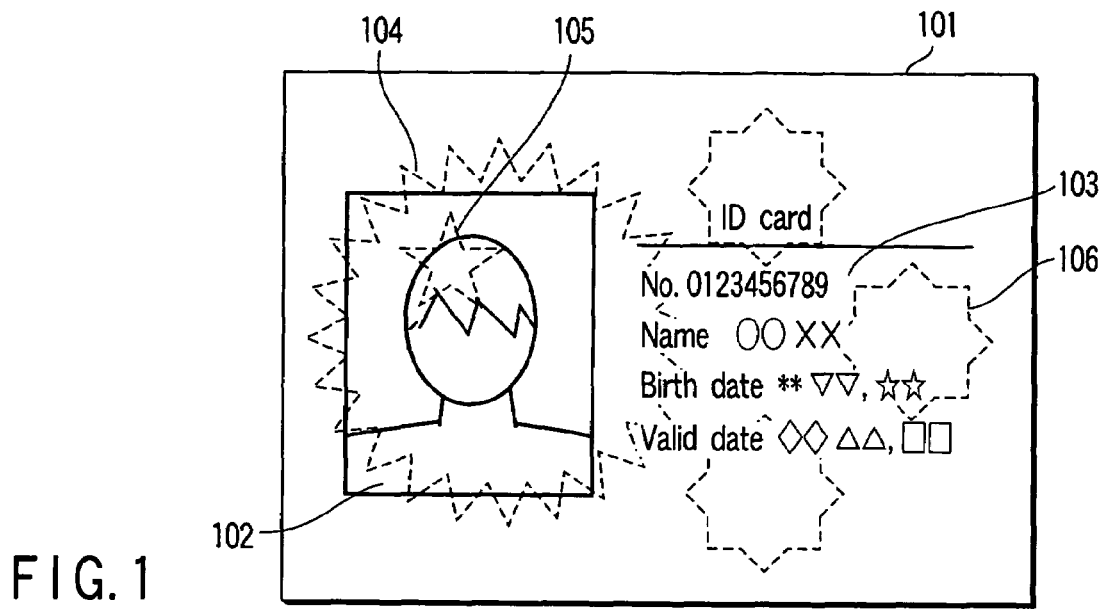
FIG. 1 is a plan view showing a practical example of an ID card as a print product.

FIG. 1 shows a practical example of an ID card 101 as a print product prepared by the first and second embodiments. FIG. 1 shows the outer appearance of the ID card 101 as a print product.

As shown in FIG. 1, the ID card 101 prepared by the first and second embodiments has OVDs (Optical Variable Devices) 104, 105, and 106 on a print surface having print regions 102 and 103.

The print region 102 is a region where a face image (an image including at least a face) of an owner of the ID card is printed (print region of a face image). The print region 103 is a region where text information including personal information associated with the owner of the ID card is printed (print region of text information). For example, the text information to be printed on the print region 103 includes the ID number of the owner (identification information unique to the owner or the ID card), name, birth date, expiration date, and the like.

The OVDs 104, 105, and 106 are optical patterns required to prevent copying, counterfeiting, alteration, and the like of the ID card 101. As the OVDs 104, 105, and 106, for example, a hologram is used.

Digital watermark information (sub information) is embedded in the image printed on the print surface of the ID card 101. For example, the digital watermark information (sub information) may be embedded to have an image of the entire print surface as a main image (to-be-embedded image) or to have an image of a partial region on the print surface as a main image (to-be-embedded image).

Also, the digital watermark information (sub information) may be embedded in a state in which it is invisible to the human eye (invisible state) into a main image (to-be-embedded image) in a state in which it is visible to the human eye (visible state), or in a visible state to the human eye into a main image (to-be-embedded image) in a visible state to the human eye.

The first and second embodiments mainly assume a case wherein digital watermark information (sub information) is embedded in an invisible state to have a face image to be printed on the print region 102 as a main image in a visible state. In this case, a composite image generated by embedding digital watermark information as sub information in an invisible state into a face image as a main image (to-be-embedded image) in a visible state is printed on the print region 102 of the face image.

The digital watermark information (sub information) is not limited as long as it is expressed as an image such as a character, symbol, numerical value, figure, mark, and the like. For example, information indicating the authenticity of the ID card 101, information (authentication data) used to authenticate the owner of the ID card 101, or the like is used as the digital watermark information (sub information). In the first and second embodiments, assume that information such as personal information of the owner of the ID card 101 is used as the digital watermark information (sub information). Furthermore, information to be printed as text information on the print region 103 may be used as the digital watermark information (sub information). In this case, the digital watermark information (sub information) embedded in the image printed on the print surface of the ID card 101 can be easily associated with the text information printed on the print region 103.

The digital watermark information (sub information) embedded in the image printed on the ID card 101 is reconstructed as needed. Note that the digital watermark information (sub information) embedded in the image printed on the ID card 101 as a recording medium is reconstructed based on the image on the print surface of the ID card, which is scanned by an optical scanning device such as a scanner, camera, or the like.

Figure 2:
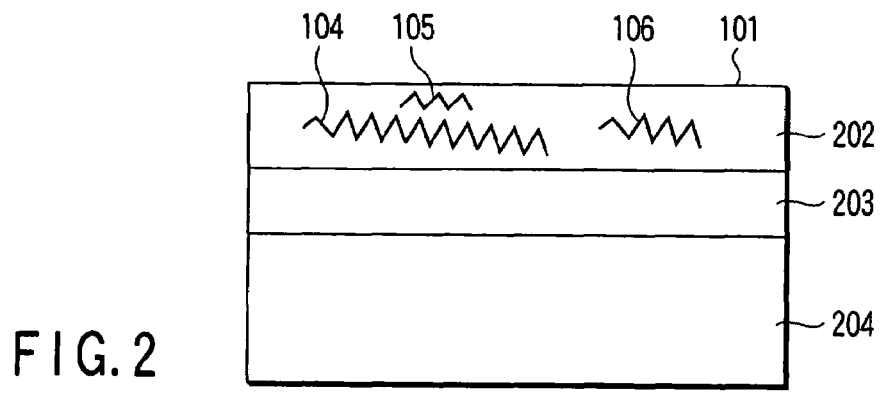
FIG. 2 is a sectional view showing an example of the structure in the section of the ID card.

FIG. 2 is a sectional view showing an example of the structure in the section of the ID card 101.

As shown in FIG. 2, the ID card 101 includes a protection layer (optical security layer) 202, recording layer (image forming layer) 203, and base layer 204. In the ID card 101, the base layer 204, recording layer (image forming layer) 203, and protection layer (optical security layer) 202 are stacked in this order.

The base layer 204 is formed of a substrate of the ID card 101. The recording layer (image forming layer) 203 is stacked on the base layer 204. The recording layer (image forming layer) 203 is formed with the face image print region 102, text information print region 103, and the like. The protection layer (optical security layer) 202 is stacked on the recording layer 203. The protection layer (optical security layer) 202 includes the OVDs 104, 105, and 106 of holograms and the like.

The ID card 101 is prepared by the step of printing a face image (composite image) and text information on the recording layer 203 stacked on the base layer 204, and the step of forming the protection layer (optical security layer) 202 on the recording layer 203 printed with the face image (composite image) and text information. The face image (composite image) and text information are printed on the recording layer 203 stacked on the base layer 204 by a color printer or the like. The protection layer (optical security layer) 202 is formed by thermocompression bonding of a protection material including the OVDs 104, 105, and 106.

The scanning processing for scanning an image recorded on the recording layer 203 of the ID card 101 with the above structure by an optical scanning device such as a scanner, camera, or the like will be described below.

In the ID card 101 with the above structure, the face image (composite image), text information, and the like printed on the recording layer 203 are scanned via the protection layer (optical security layer) 202. Especially, in the ID card 101, digital watermark information (sub information) is embedded in the image (e.g., the face image) printed on the recording layer 203.

That is, upon reconstructing the digital watermark information from the composite image printed on the recording layer 203 of the ID card 101, the image printed on the recording layer 203 of the ID card 101 is read out as digital information by the optical scanning device such as a scanner, camera, or the like. In this case, the optical scanning device such as a scanner, camera, or the like scans the image printed on the recording layer 203 via the protection layer (optical security layer) 202.

For this reason, when the protection layer (optical security layer) 202 on the recording layer 203 is colored or when the optical reflectance of the OVDs 104, 105, and 106 formed in the protection layer 202 on the recording layer 203 is high, it becomes difficult for the optical scanning device to scan the image printed on the recording layer 203 with high precision. As the scanning precision of the image printed on the recording layer 203 by the optical scanning device becomes lower, it becomes harder to reconstruct the digital watermark information (sub information) embedded in the image printed on the recording layer 203 (the reconstruction ratio of the digital watermark information to be described later lowers).

The "degree of optical shielding" will be described below.

In the first and second embodiments, assume that the "degree of optical shielding" is defined as an index indicating the optical scanning difficulty due to the presence of the protection layer (optical security layer) 202 with respect to the surface of the recording layer 203.

Figure 3A:
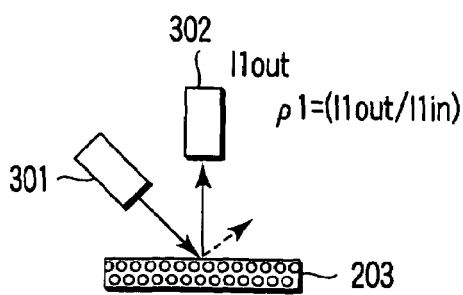
FIG. 3A is a view for explaining the definition of a degree of optical shielding.
Figure 3B:
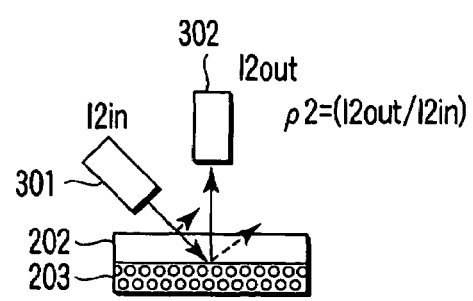
FIG. 3B is a view for explaining the definition of a degree of optical shielding.

FIGS. 3A and 3B are views for explaining the definition of the "degree of optical shielding".

FIGS. 3A and 3B show the states of reflection of light that strikes the surface (measurement surface) of the recording layer 203 at an angle of 45°. Especially, FIG. 3A shows the state of reflection of light that strikes the surface (measurement surface) of the recording layer 203 at an angle of 45° when no protection layer (optical security layer) 202 is formed on the recording layer 203. FIG. 3B shows the state of reflection of light that strikes the surface (measurement surface) of the recording layer 203 at an angle of 45° when the protection layer (optical security layer) 202 is formed on the recording layer 203.

FIGS. 3A and 3B illustrate a light source 301 and detector 302. The light source 301 irradiates the surface (measurement surface) of the recording layer 203 with irradiation light of a predetermined light amount. The light source 301 is set to irradiate the surface (measurement surface) of the recording layer 203 with irradiation light at an angle of 45°. The detector 302 is set to detect the light amount of light reflected in a direction perpendicular to the surface (measurement surface) of the recording layer 203.

Assume that $\rho 1$ and $\rho 2$ are defined as follows.

$\rho 1$ is the ratio (reflectance) of the light amount of reflected light detected by the detector 302 to that of irradiation light output from the light source 301 when no protection layer (optical security layer) 202 is formed on the recording layer 203, as shown in FIG. 3A. Also, $\rho 2$ is the ratio (reflectance) of the light amount of reflected light detected by the detector 302 to that of irradiation light output from the light source 301 when the protection layer (optical security layer) 202 is formed on the recording layer 203, as shown in FIG. 3B.

Using $\rho 1$ and $\rho 2$ above, a "degree of optical shielding" C by the protection layer (optical security layer) 202 shown in FIG. 3B is defined by:

$$C=(1-\rho 2/\rho 1)$$

Therefore, according to the above definition, the light amount of the light reflected by the surface of the recording layer decreases with increasing degree of optical shielding C. In other words, the scanning precision of the image recorded on the recording layer 203 by the optical scanning device becomes lower (the image recorded on the recording layer 203 becomes harder to be scanned) with increasing degree of optical shielding C of the protection layer (optical security layer) 202. Conversely, the light amount of the light reflected by the surface of the recording layer 203 increases with decreasing degree of optical shielding C. In other words, the scanning precision of the image recorded on the recording layer 203 by the optical scanning device increases (the image recorded on the recording layer 203 becomes easier to be scanned) with decreasing degree of optical shielding C of the protection layer (optical security layer) 202.

The first embodiment for preparing the aforementioned ID card 101 will be described below.

Figure 4:
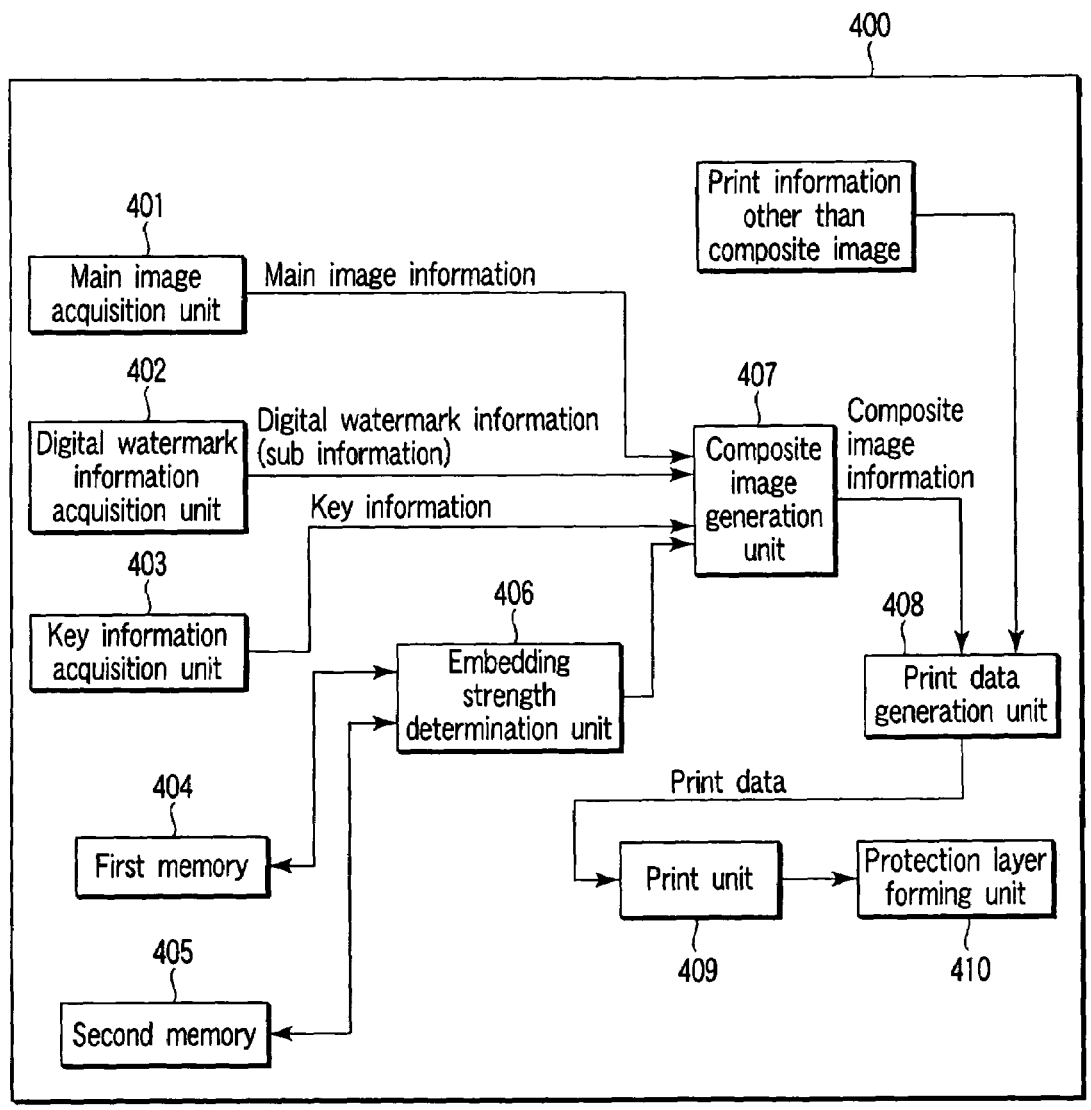
FIG. 4 is a schematic block diagram showing the arrangement of an image processing apparatus according to the first embodiment.

FIG. 4 schematically shows an example of the arrangement of an image processing apparatus 400 according to the first embodiment.

The image processing apparatus 400 shown in FIG. 4 comprises a main image acquisition unit 401, digital watermark information acquisition unit (sub information acquisition unit) 402, key information acquisition unit 403, first memory 404, second memory 405, embedding strength determination unit 406, composite image generation unit 407, print data generation unit 408, print unit 409, protection layer forming unit 410, and the like.

The main image acquisition unit 401 acquires main image information (to-be-embedded image) in which digital watermark information is to be embedded. The ID card 101 uses the face image of its owner as the main image. Therefore, the main image acquisition unit 401 comprises a device which acquires the face image of the owner of the ID card 101 as the main image information. For example, the unit 401 comprises a camera or scanner for sensing a face image, an image interface for acquiring a face image from an external device, or the like.

The main image to be acquired by the main image acquisition unit 401 may be either a monochrome density image or a color image. The main image to be acquired by the main image acquisition unit 401 may be the image of the entire print surface of the ID card, which includes the face information, text information, and the like. In this case, the main image acquisition unit 401 may acquire face image information, text information, and the like to be printed on the print surface of the ID card, and may generate an image to be printed on the entire print surface as a main image based on these pieces of information.

The digital watermark information acquisition unit (sub information acquisition unit) 402 acquires digital watermark information (sub information). For example, the ID card 101 uses personal information of its owner as sub information. In this case, the digital watermark information acquisition unit (sub information acquisition unit) 402 comprises an input device used to input personal information, an interface used to acquire personal information from an external device, or the like.

Note that the digital watermark information (sub information) to be acquired by the digital watermark information acquisition unit 402 is not limited to personal information such as the name, birth date, and the like. For example, the digital watermark information (sub information) to be acquired by the digital watermark information acquisition unit 402 may be information such as a binary random bit sequence, corporate name, logo mark of an organization, or the like.

The key information acquisition unit 403 acquires key information required to prepare the ID card 101. The key information to be acquired by the key information acquisition unit 403 is information which serves as a key in processing (embedding processing of digital watermark information) for generating composite image information obtained by embedding the sub information into the main image information. The key information to be acquired by the key information acquisition unit 403 is also information which serves as a key in reconstruction processing for reconstructing the sub information from the composite image.

The first memory 404 stores information indicating the distribution of degrees of optical shielding of the protection layer (optical security layer) 202 on the ID card 101 to be prepared by the image processing apparatus. That is, the first memory 404 pre-stores information indicating the distribution of degrees of optical shielding of the protection layer (optical security layer) 202 formed on the recording layer 203 of a recording medium to be prepared as the ID card 101.

For example, the first memory 404 stores information indicating the degrees of optical shielding of a plurality of regions which form the entire print region (or the print region of the composite image) of the ID card to be prepared. Furthermore, the first memory 404 may store information indicating the distributions of degree of optical shielding of various ID cards. In this case, the information indicating the distribution of degrees of optical shielding corresponding to the ID card to be prepared is read out from the first memory 404.

Note that the information indicating the degrees of optical shielding of a plurality of regions which form the entire print region (or the print region of the composite image) of the ID card may be acquired from, e.g., an external device. In this case, the image processing apparatus comprises an information acquisition unit which acquires information indicating the degrees of optical shielding of a plurality of regions which form the entire print region (or the print region of the composite image) of the ID card in place of the first memory 404.

The second memory 405 stores information indicating the embedding strengths of the digital watermark information (sub information) in correspondence with the degrees of optical shielding. For example, the second memory 405 pre-stores information indicating the embedding strengths of sub information in correspondence with the degrees of optical shielding in the print regions of the ID card to be prepared. The embedding strengths of the digital watermark information (sub information) will be described in detail later.

Note that the information indicating the embedding strengths of sub information corresponding to the degrees of optical shielding in the print regions of the ID card may be acquired from an external device or the like. In this case, the image processing apparatus comprises an information acquisition unit which acquires information indicating the embedding strengths of sub information corresponding to the degrees of optical shielding in the print regions of the ID card in place of the second memory 405.

The embedding strength determination unit 406 serves as a determination unit which determines the embedding method of sub information for embedding sub information in a main image. The embedding strength determination unit 406 determines the embedding strengths of digital watermark information (sub information) for a plurality of regions which form the entire print region (or the region where the composite image is to be printed). The embedding strength determination unit 406 determines the embedding strengths of digital watermark information (sub information) for a plurality of regions which form the entire print region (or the region where the composite image is to be printed) based on the information stored in the first and second memories 404 and 405.

The composite image generation unit 407 executes processing for generating a composite image obtained by embedding sub information in main image information. The composite image generation processing by the composite image generation unit 407 is implemented using a method of digital watermark processing for embedding sub information in main image information. Furthermore, the composite image generation unit 407 executes processing for generating composite image information with reference to the determination result determined by the embedding strength determination unit 406. That is, the composite image generation unit 407 executes processing for embedding digital watermark information (sub information) acquired by the digital watermark acquisition unit 402 into main image information acquired by the main image acquisition unit 401 based on the sub information embedding method into the main image determined by the embedding strength determination unit 406.

Note that the composite image generation unit 407 of this embodiment especially assumes digital watermark processing using color difference modulation processing as the composite image generation processing (digital watermark processing). As the digital watermark processing method using the color difference modulation processing, for example, the method described in Jpn. Pat. Appln. KOKAI Publication No. 11-355554, 2001-268346, or the like can be applied. When the digital watermark processing method of Jpn. Pat. Appln. KOKAI Publication No. 2001-268346 is used, each embedding strength determined by the embedding strength determination unit 406 indicates the magnitude of an "embedding color difference amount".

In the first embodiment, the composite image generation unit 407 executes processing for embedding the digital watermark information (sub information) into the main image information based on the embedding strengths of the digital watermark information for a plurality of regions which form the entire print region (or the print region of the composite image) determined by the embedding strength determination unit 406. For example, the composite image generation unit 407 associates a plurality of regions which form the entire print region (or the print region of the composite image) and embedding strengths of which are determined by the embedding strength determination unit 406 with those which form the entire main image information (or the print region of the composite image). In this way, the composite image generation unit 407 determines the embedding strengths of the sub information for the respective regions of the main image information. After the embedding strengths of the sub information for the respective regions of the main image information are determined, the composite image generation unit 407 generates composite image information obtained by embedding sub information in the respective regions of the main image information at the determined embedding strengths.

The print data generation unit 408 generates print data to be printed on the recording layer 203 of a recording medium used as the ID card 101. The print data generation unit 408 generates print data based on the composite image information generated by the composite image generation unit 407 and print information (for example, information to be printed as text information) other than the composite image, which is supplied by a control unit (not shown) or the like.

The print unit 409 prints the print data generated by the print data generation unit 408 on the recording layer 203 of a recording medium used as the ID card 101. The print unit 409 prints the face image print region 102 in which the sub information is embedded in a face image as the main image on the recording layer 203 of the recording medium used as the ID card 101.

The protection layer forming unit 410 forms the protection layer (optical security layer) 202 including the OVDs 104, 105, and 106 on the recording layer 203 on which the print data including the composite image is printed by the print unit 409.

An example of the degrees of optical shielding by the protection layer (optical security layer) 202 will be explained below.

Figure 5:
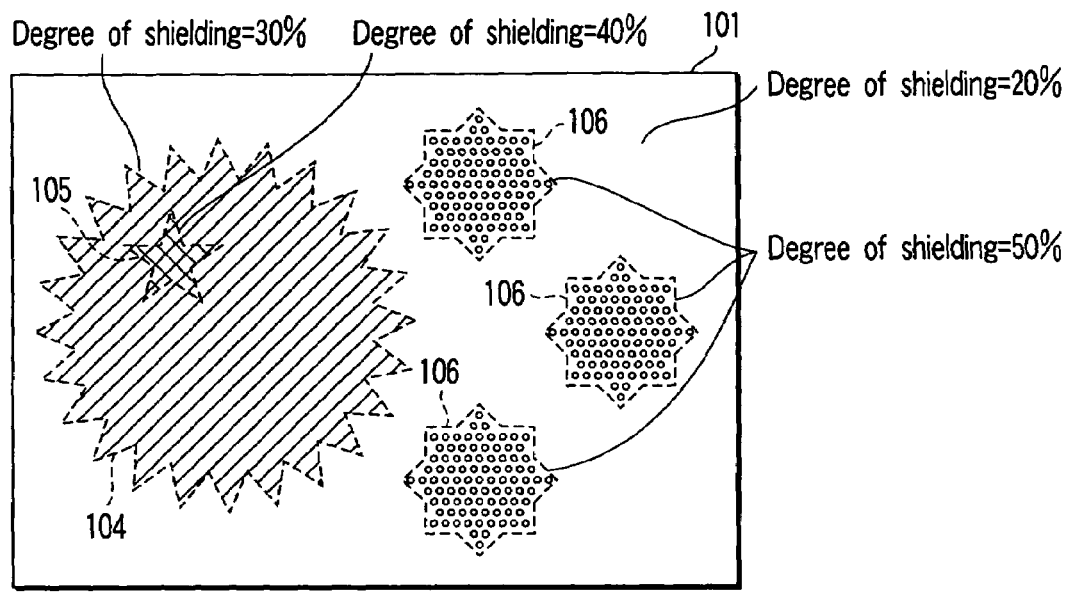
FIG. 5 shows an example of the degrees of optical shielding by a protection layer (optical security layer)
Figure 6:
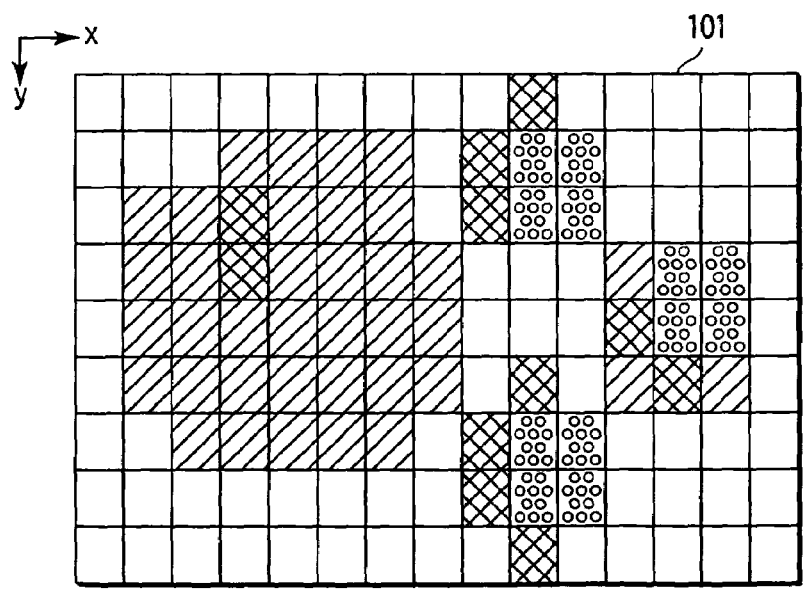
FIG. 6 shows an example of the distribution of the degrees of optical shielding on a print surface which is divided into a plurality of regions.

FIG. 5 shows an example of the degrees of optical shielding by the protection layer (optical security layer) 202 of the ID card 101 shown in FIG. 1. FIG. 6 shows the distribution of degrees of optical shielding generated based on the protection layer 202 having the degrees of optical shielding shown in FIG. 5. FIG. 7 shows an example of information indicating the degrees of optical shielding stored in the first memory 404. FIG. 7 shows the example of information indicating the distribution of degrees of optical shielding shown in FIG. 6.

In the example of the ID card 101 shown in FIG. 5, the degree of optical shielding of a region in which the OVD 104 is formed is 30%, that of a region in which the OVD 105 is formed is 40%, that of a region in which the OVD 106 is formed is 50%, and that of a region in which no OVD is formed is 20%.

As shown in FIG. 6, assume that the print region (the region of the entire surface) of the ID card 101 shown in FIG. 5 is divided into regions of a total of 135 blocks (=15 blocks in the horizontal direction×9 blocks in the vertical direction). Then, the degrees of optical shielding of the respective regions assume values falling within the range from 20% to 50% in correspondence with those of the OVDs 104, 105, and 106, shown in FIG. 5.

The degrees of optical shielding of the respective regions shown in FIG. 6 are held in the first memory 404 as information corresponding to the coordinates of the respective regions, as shown in FIG. 7. That is, the first memory 404 stores the coordinate values and degrees of optical shielding for the 135 regions which form the print region of the ID card 101 in correspondence with each other.

Note that the information indicating the distribution of degrees of optical shielding on the surface of the ID card 101 may be held in correspondence with the types of ID cards to be prepared. In this case, the first memory 404 holds information indicating the distributions of degrees of optical shielding in correspondence with various ID cards.

A setting example of the embedding strengths of sub information corresponding to the degrees of optical shielding will be described below.

FIG. 8 shows an example of information indicating the embedding strengths of sub information corresponding to the degrees of optical shielding, which are stored in the second memory 405.

The example shown in FIG. 8 shows the ranks of embedding strengths of sub information in correspondence with the degrees of optical shielding. In the example of FIG. 8, the rank of the embedding strength of sub information becomes higher with increasing degree of optical shielding. As described above, the first embodiment assumes the "embedding color difference amount" as the embedding strength. For this reason, in the example shown in FIG. 8, the embedding color difference values is set as the values of the embedding strengths of sub information corresponding to the ranks of the embedding strengths. That is, in the example shown in FIG. 8, the digital watermark embedding strength is higher with increasing embedding color difference amount. In the example shown in FIG. 8, a combination of green (G) and magenta (M) is selected as an example of a combination of complementary colors used to embed sub information.

Also, in the example shown in FIG. 8, when the degree of optical shielding is equal to or higher than a predetermined maximum value (80%), it is set not to embed sub information. This is for the following reason. That is, when the degree of optical shielding is equal to or higher than the predetermined maximum value (80%), the degree of optical shielding is too high to reconstruct the sub information even when the embedding strength of sub information is increased.

The relationship between the degree of optical shielding and reconstruction ratio of digital watermark information (sub information) will be described below.

Figure 9A:
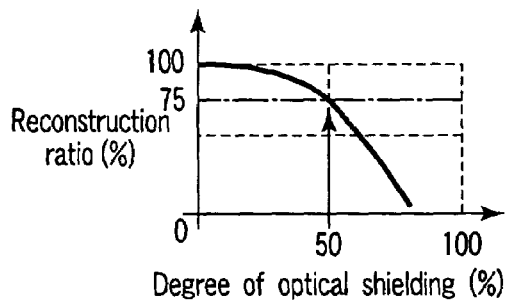
FIG. 9A is a schematic diagram showing the relationship between the degree of optical shielding and reconstruction ratio of digital watermark information in an ID card.
Figure 9B:
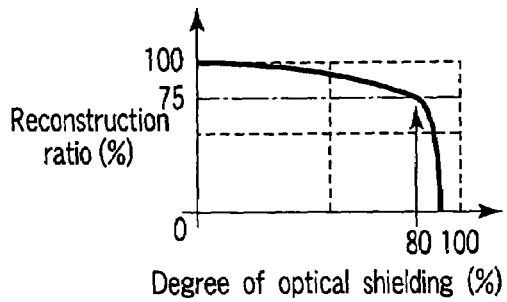
FIG. 9B is a schematic diagram showing the relationship between the degree of optical shielding and reconstruction ratio of digital watermark information in the ID card prepared according to the first embodiment.

FIGS. 9A and 9B show the relationship between the degree of optical shielding and the reconstruction ratio of digital watermark information (sub information).

Note that the reconstruction ratio of digital watermark information (sub information) is a value indicating the ratio of an "information volume of sub information which can be reconstructed normally" to an "information volume of sub information which is embedded (that of embedded sub information)". That is, the reconstruction ratio is described by "{(information volume of sub information which can be reconstructed normally)/(information volume of sub information which is embedded)}×100%". Note that the "information volume of sub information which is embedded" is that of sub information which is embedded in a main image in a composite image printed on the ID card. Also, the "information volume of sub information which can be reconstructed normally" is that of correct information of the sub information which is reconstructed from an image scanned from the ID card on which the composite image is printed.

For example, the higher the reconstruction ratio of digital watermark information is, the better the reconstruction property of the digital watermark information is. For example, when digital watermark information can be perfectly reconstructed from an image scanned from the ID card, the reconstruction ratio of the digital watermark information is 100%. If no digital watermark information can be reconstructed from an image scanned from the ID card, the reconstruction ratio of the digital watermark information is 0%.

FIG. 9A shows an example of the relationship between the "degree of optical shielding" and "reconstruction ratio" for an ID card on which a composite image obtained by embedding sub information into a main image at constant embedding strengths irrespective of the degrees of optical shielding is printed. By contrast, FIG. 9B shows an example of the relationship between the "degree of optical shielding" and "reconstruction ratio" for an ID card on which a composite image obtained by embedding sub information into a main image at embedding strengths corresponding to the degrees of optical shielding (by increasing the embedding strength with increasing degree of optical shielding) is printed.

As shown in FIGS. 9A and 9B, if the degree of optical shielding (X-axis) assumes a value near 0%, the reconstruction ratio of sub information (Y-axis) assumes nearly 100% independently of the constant embedding strength of sub information or the embedding strength corresponding to the degree of optical shielding. This indicates that the embedded sub information can be nearly perfectly reconstructed.

However, the reconstruction ratio of sub information lowers with increasing value of the degree of optical shielding. Normally, in the reconstruction processing of digital watermark information (sub information), error correction processing is executed together. An information volume that can be corrected by this error correction processing is about 25% of the original information volume. However, when the reconstruction ratio becomes less than 75%, the embedded sub information cannot be perfectly reconstructed even when the error correction processing is executed together.

In the example shown in FIG. 9A, when the degree of optical shielding is about 50%, the reconstruction ratio of sub information is about 75%. Furthermore, in the example shown in FIG. 9A, when the degree of optical shielding exceeds about 50%, the reconstruction ratio of sub information becomes less than 75%. Therefore, in case of FIG. 9A, i.e., when the embedding strength of sub information is constant irrespective of the degree of optical shielding, if the degree of optical shielding exceeds about 50%, the reconstruction ratio of sub information becomes less than 75%. In other words, when the embedding strength of sub information is constant irrespective of the degree of optical shielding, if the degree of optical shielding exceeds about 50%, the embedded sub information cannot be perfectly reconstructed even when the error correction processing is executed together.

By contrast, in the example shown in FIG. 9B, the degree of decreasing the reconstruction ratio of sub information with increasing degree of optical shielding is very moderate compared to the example shown in FIG. 9A. For example, in the example shown in FIG. 9B, the degree of optical shielding becomes equal to or higher than 80% when the reconstruction ratio of sub information is less than 75%. Also, in the example shown in FIG. 9B, a high reconstruction ratio of sub information is maintained even when the degree of optical shielding assumes a value around 50% at which the reconstruction ratio of sub information becomes about 75% in the example shown in FIG. 9A.

As described above, the second memory 405 is set to increase the embedding strength of digital watermark information with increasing degree of optical shielding. The composite image information obtained by embedding sub information into a main image based on such embedding strength setting can prevent the reconstruction ratio of sub information from dropping with increasing degree of optical shielding. As a result, digital watermark information can be stably reconstructed from the ID card on which such composite image information is printed. Therefore, an ID card with higher reconstruction property of digital watermark information (sub information) in a composite image to be printed can be provided.

A processing example of the first embodiment will be described below.

FIG. 10 is a flowchart for explaining a processing example of the image processing apparatus 400.

In the image processing apparatus 400, the main image acquisition unit 401 acquires a face image as main image information (step S101). The digital watermark information acquisition unit (sub information acquisition unit) 402 acquires sub information (step S102). Furthermore, the key information acquisition unit 403 acquires key information (step S103).

On the other hand, the embedding strength determination unit 406 of the image processing apparatus acquires information indicating the degrees of optical shielding of respective regions in the print region (or that of the composite image) of the ID card to be prepared from the first memory 404 (step S104). Furthermore, the unit 406 acquires information indicating the embedding strengths (e.g., embedding color difference amounts) of digital watermark information (sub information) corresponding to the degrees of optical shielding from the second memory 405 (step S105).

After these pieces of information are acquired, the embedding strength determination unit 406 determines the embedding strengths of digital watermark information in correspondence with the respective regions of the print region on the ID card to be prepared (step S106). The embedding strength determination unit 406 checks the degrees of optical shielding of respective regions on the basis of the information acquired from the first memory 404, and sets embedding strengths corresponding to the degrees of optical shielding of the respective regions as those for the respective regions based on the information acquired from the second memory 405.

After the embedding strength determination unit 406 determines the embedding strengths for the respective regions, the composite image generation unit 407 executes processing for generating composite image information based on the main image information, sub information, key information, and information indicating the embedding strengths of sub information for the respective regions (step S107). The composite image generation unit 407 determines the embedding strengths of sub information for the respective regions of the main image information by associating the main image information with the respective regions whose embedding strengths are determined by the embedding strength determination unit 406. After the embedding strengths of sub information for the respective regions of the main image information are determined, the composite image generation unit 407 embeds the sub information at the determined embedding strengths into the respective regions of the main image information using the key information.

In this way, the composite image generation unit 407 generates composite image information obtained by embedding the sub information into the main image information at the embedding strengths corresponding to the degrees of optical shielding of the protection layer 202 in the ID card to be prepared. The composite image information generated by the composite image generation unit 407 is output to the print data generation unit 408.

The print data generation unit 408 which receives the composite image information from the composite image generation unit 407 generates print data to be printed on a recording medium as the ID card based on that composite image information and print information other than the composite image information (step S108). The print data generated by the print data generation unit 408 is output to the print unit 409.

The print unit 409 which receives the print data from the print data generation unit 408 prints the print data on the recording layer 203 of the recording medium used as the ID card (step S109). The recording medium on the recording layer 203 of which the print data is printed by the print unit 409 is supplied to the protection layer forming unit 410.

The protection layer forming unit 410 which receives the recording medium on the recording layer 203 of which the print data is printed from the print unit 409 forms the protection layer 202 made up of a protection material including OVDs at predetermined positions on the recording layer 203 of the recording medium (step S110).

As described above, the image processing apparatus of the first embodiment determines the embedding strengths required to embed sub information into a main image to be printed on the recording layer on the basis of the degrees of optical shielding with respect to the surface of the recording layer due to the protection or security layer to be formed on the recording layer on which an image is printed in a recording medium. Then, the apparatus generates a composite image obtained by embedding the sub information into the main image at the determined embedding strengths as the image to be printed on the recording layer of the recording medium.

In this manner, even in the state in which composite image formed by embedding sub information into a main image is printed on the recording medium, the sub information embedded in the composite image can be stably reconstructed.

Furthermore, the image processing apparatus of the first embodiment stores information indicating the degrees of optical shielding of respective regions on the surface of the recording layer in the first memory, and stores information indicating the embedding strengths corresponding to the degrees of optical shielding in the second memory. Based on the information stored in the first and second memories, the apparatus determines the embedding strengths of sub information for respective regions of a main image, and generates a composite image obtained by embedding the sub information into the main image at the determined embedding strengths as an image to be printed on the recording layer of the recording medium.

In this way, the sub information can be embedded into the main image at optimal embedding strengths. As a result, the composite image embedded with the sub information which can be reconstructed stably can be generated.

The second embodiment of preparing the aforementioned ID card 101 will be described below.

The arrangement of an image processing apparatus according to the second embodiment will be described first.

Figure 11:
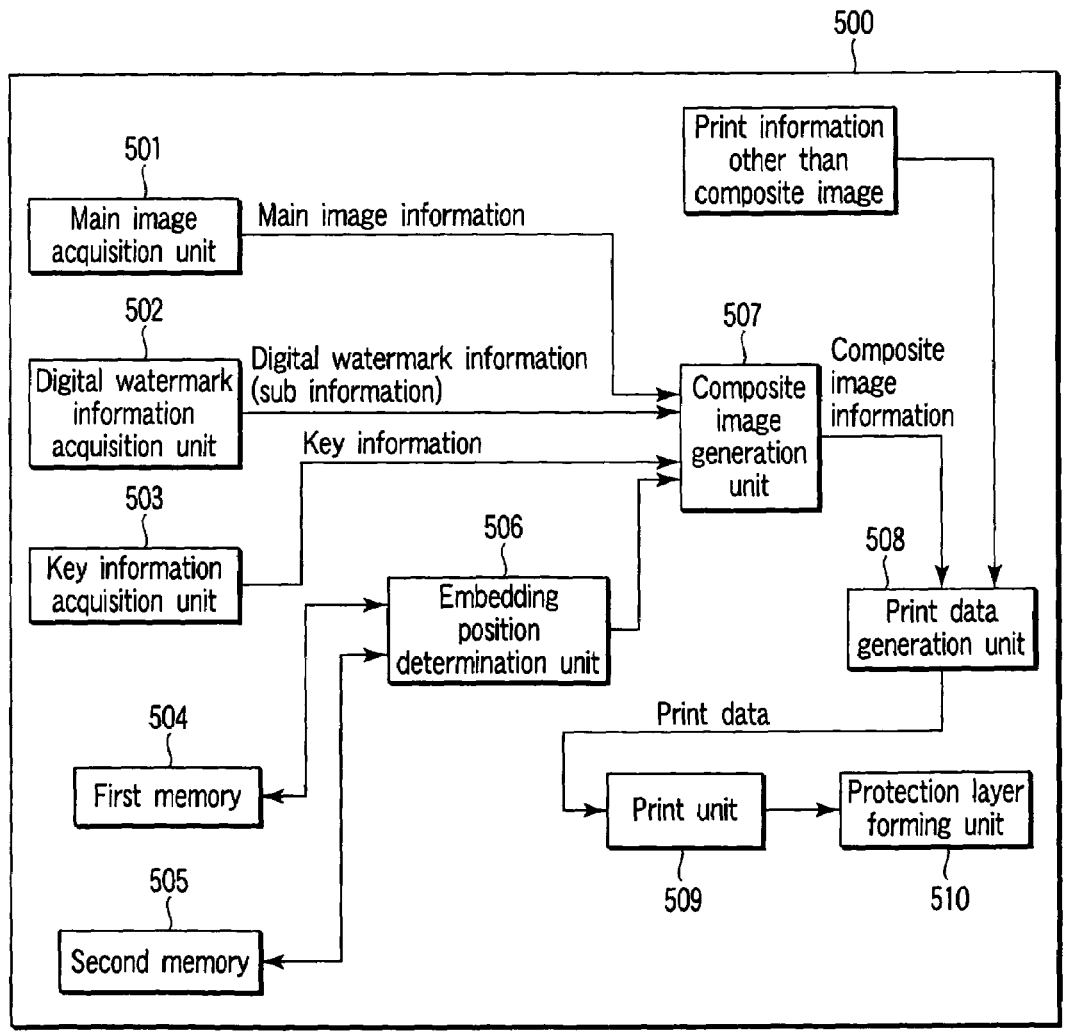
FIG. 11 is a schematic block diagram showing the arrangement of an image processing apparatus according to the second embodiment.

FIG. 11 schematically shows an example of the arrangement of an image processing apparatus 500 according to the second embodiment.

Note that an ID card to be prepared by the image processing apparatus 500 according to the second embodiment has the same structure as that to be prepared by the image processing apparatus 400 of the first embodiment, as shown in FIGS. 1 and 2. Hence, a detailed description of the ID card 101 to be prepared by the second embodiment will be omitted.

As shown in FIG. 11, the image processing apparatus 500 according to the second embodiment comprises a main image acquisition unit 501, digital watermark information acquisition unit (sub information acquisition unit) 502, key information acquisition unit 503, first memory 504, second memory 505, embedding position determination unit 506, composite image generation unit 507, print data generation unit 508, print unit 509, protection layer forming unit 510, and the like.

The main image acquisition unit 501 acquires main image information. The digital watermark information acquisition unit (sub information acquisition unit) 502 acquires sub information. The key information acquisition unit 503 acquires key information required to prepare the ID card 101.

Note that the main image acquisition unit 501, digital watermark information acquisition unit (sub information acquisition unit) 502, and key information acquisition unit 503 respectively have the same arrangements as those of the main image acquisition unit 401, digital watermark information acquisition unit (sub information acquisition unit) 402, and key information acquisition unit 403. For this reason, a detailed description of the main image acquisition unit 501, digital watermark information acquisition unit (sub information acquisition unit) 502, and key information acquisition unit 503 will be omitted.

The first memory 504 stores information indicating the distribution of degrees of optical shielding of the protection layer (optical security layer) 202 on the ID card 101 to be prepared by the image processing apparatus. That is, the first memory 504 pre-stores information indicating the distribution of degrees of optical shielding of the protection layer 202 formed on the recording layer 203 of a recording medium to be prepared as the ID card 101.

Note that the information to be stored in the first memory 504 may be the same as that stored in the first memory 404. That is, the first memory 504 stores the information shown in, e.g., FIG. 7.

Also, the information indicating the degrees of optical shielding of respective regions of the print region of the ID card may be acquired from, e.g., an external device. In this case, the image processing apparatus comprises an information acquisition unit which acquires information indicating the degrees of optical shielding of the respective regions of the print region of the ID card in place of the first memory 504.

The second memory 505 stores information indicating appropriate levels of embedding positions of digital watermark information (sub information) corresponding to the degrees of optical shielding. For example, the second memory 505 pre-stores information indicating the appropriate levels of the embedding positions of the sub information corresponding to the degrees of optical shielding on the print region of the ID card to be prepared. The appropriate levels of the embedding positions of the digital watermark information (sub information) will be described in detail later.

Note that the information indicating the appropriate levels of the embedding positions of the sub information corresponding to the degrees of optical shielding on the print region of the ID card may be acquired from an external device or the like. In this case, the image processing apparatus comprises an information acquisition unit which acquires the information indicating the appropriate levels of the embedding positions of the sub information corresponding to the degrees of optical shielding on the print region of the ID card in place of the second memory 505.

The embedding position determination unit 506 serves as a determination unit which determines the embedding method of sub information for embedding sub information in a main image. The embedding position determination unit 506 determines priority levels (appropriate levels) of the embedding positions of digital watermark information (sub information) for respective regions of the print region (the surface of the recording layer 203 of the ID card 101) as the method for embedding sub information into a main image.

More specifically, the embedding position determination unit 506 determines the priority levels of the embedding positions (embedding regions) of digital watermark information for respective regions of the print information based on the information stored in the first and second memories 504 and 505. Furthermore, the embedding position determination unit 506 determines layout (layout of sub information) information indicating the regions to be embedded with sub information based on the priority levels of the respective regions.

In the digital watermark processing method based on the color difference modulation processing or the like, sub information is preferably embedded in a main image such as a face image or the like, as described above. In this case, the embedding positions of sub information are limited to those in the main image. In other words, the embedding regions of sub information are limited to those within the region where a composite image is printed on the print region (the surface of the recording layer 203) of the ID card. For example, on the ID card 101 with the configuration shown in FIG. 1, the embedding region of sub information is limited to the region 102 where the composite image is printed. Therefore, in the second embodiment, the embedding position determination unit 506 determines the layout of sub information in the region 102 where the composite image is printed. Also, information indicating the region 102 where the composite image is printed may be stored in the first or second memory 504 or 505.

The composite image generation unit 507 executes processing for generating a composite image obtained by embedding sub information in main image information using the digital watermark processing method based on the color difference modulation method or the like as in the composite image generation unit 407. Furthermore, the composite image generation unit 507 executes processing for generating composite image information with reference to the determination result determined by the embedding position determination unit 506.

That is, the composite image generation unit 507 executes processing for embedding digital watermark information (sub information) acquired by the digital watermark acquisition unit 502 into main image information acquired by the main image acquisition unit 501 based on the sub information embedding method into the main image determined by the embedding position determination unit 506.

In the second embodiment, the composite image generation unit 507 executes processing for embedding the digital watermark information into the main image information based on the layout information of sub information indicating the embedding regions of the digital watermark information (sub information) determined by the embedding position determination unit 506. For example, the composite image generation unit 507 determines the embedding regions of sub information in the main image information based on the layout information of the sub information determined by the embedding position determination unit 506. After the embedding regions of the sub information in the main image information is determined, the composite image generation unit 507 generates composite image information obtained by embedding the sub information into the embedding regions of the sub information in the main image information.

Note that the embedding position determination unit 506 may determine only the priority levels of respective regions, and the composite image generation unit 507 may determine layout (layout of sub information) information indicating the embedding regions of sub information based on the priority levels of the respective regions. For example, when the information volume of sub information largely varies every time the ID card is prepared, the composite image generation unit 507 can set the layout of sub information in accordance with the acquired information volume of sub information.

The print data generation unit 508 generates print data to be printed on the recording layer 203 of a recording medium used as the ID card 101. The print unit 509 prints the print data generated by the print data generation unit 508 on the recording layer 203 of a recording medium used as the ID card 101. The protection layer forming unit 510 forms the protection layer (optical security layer) 202 including the OVDs 104, 105, and 106 on the recording layer 203 on which the print data including the composite image is printed by the print unit 509.

Note that the print data generation unit 508, print unit 509, and protection layer forming unit 510 respectively have the same arrangements as those of the print data generation unit 408, print unit 409, and protection layer forming unit 410. For this reason, a detailed description of the print data generation unit 508, print unit 509, and protection layer forming unit 510 will be omitted.

A setting example of the priority levels of the embedding positions of sub information corresponding to the degrees of optical shielding will be described below.

FIG. 12 shows an example of information indicating the priority levels of the embedding positions of sub information corresponding to the degrees of optical shielding stored in the second memory 505.

In the example shown in FIG. 12, the priority levels of the embedding positions of sub information corresponding to the degrees of optical shielding are classified by ranks A to H. In FIG. 12, A indicates the highest priority level, and H indicates the lowest priority level. As shown in FIG. 12, the priority level of the embedding position of sub information becomes lower with increasing degree of optical shielding.

In the example shown in FIG. 12, it is set not to determine a region where the degree of optical shielding is equal to or higher than a predetermined maximum value (80%) as the embedding region of sub information. This is for the following reason, in the region where the degree of optical shielding is equal to or higher than the predetermined maximum value (80%), the degree of optical shielding is too high to reconstruct the sub information.

As described above, the second memory 505 is set with a low priority level of the embedding position of digital watermark information for a region with a high degree of optical shielding, and a high priority level of the embedding position of digital watermark information for a region with a low degree of optical shielding. Composite image information in which digital watermark information is preferentially embedded in a region with a low degree of optical shielding in a main image based on such setting can prevent the reconstruction ratio of digital watermark information from dropping due to an increase in degree of optical shielding. As a result, digital watermark information can be stably reconstructed from the ID card on which such composite image information is printed. Therefore, an ID card with higher reconstruction property of digital watermark information (sub information) in a composite image to be printed can be provided.

A processing example of the second embodiment will be described below.

Figure 13:
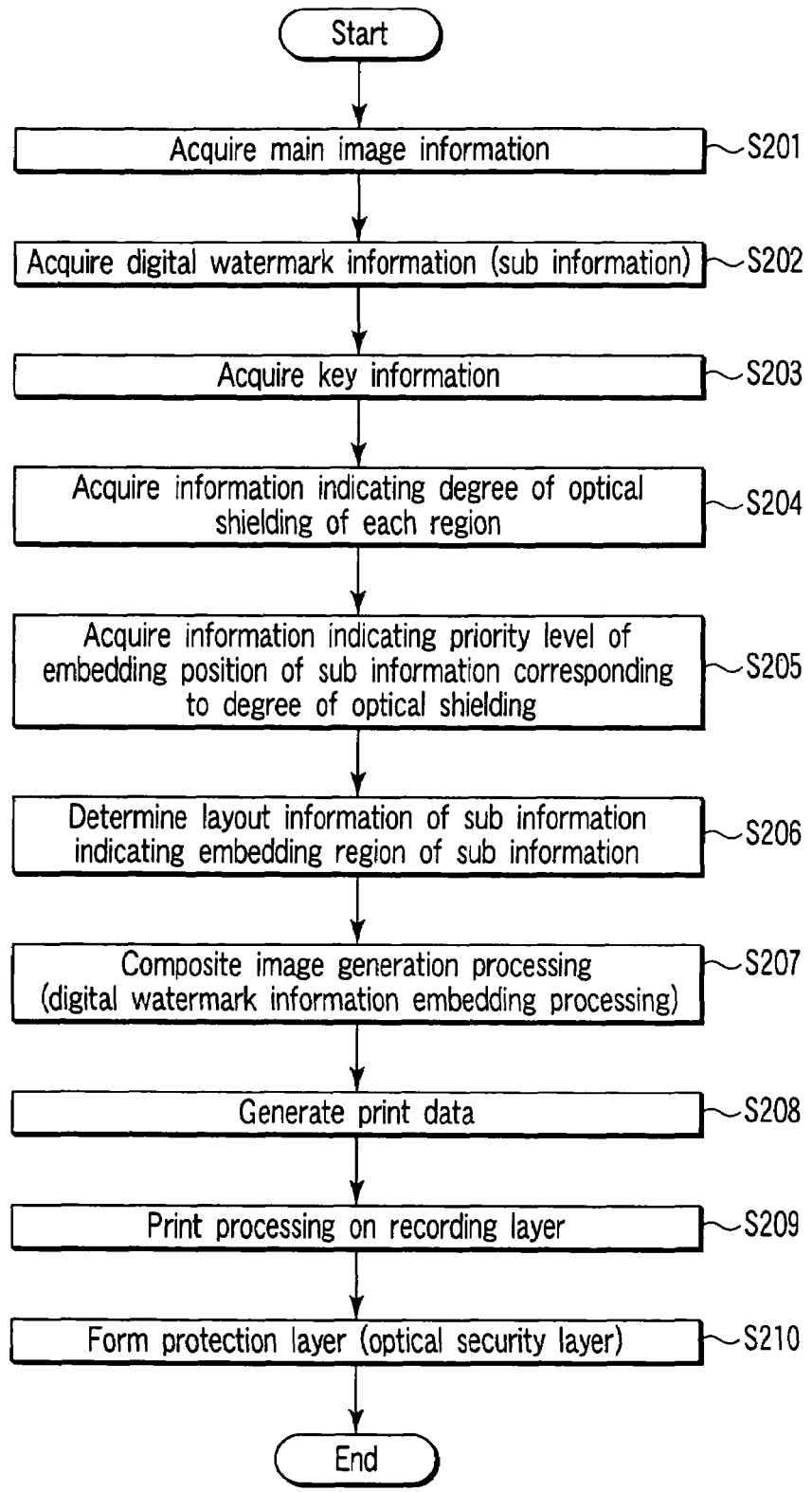
FIG. 13 is a flowchart for explaining an example of processing according to the second embodiment.

FIG. 13 is a flowchart for explaining a processing example of the image processing apparatus 500.

In the image processing apparatus 500, the main image acquisition unit 501 acquires a face image as main image information (step S201). The digital watermark information acquisition unit (sub information acquisition unit) 502 acquires sub information (step S202). Furthermore, the key information acquisition unit 503 acquires key information (step S203).

On the other hand, the embedding position determination unit 506 of the image processing apparatus 500 acquires information indicating the degrees of optical shielding of respective regions in the print region (or that of the composite image) of the ID card to be prepared from the first memory 504 (step S204). Furthermore, the unit 506 acquires information indicating the priority levels of the embedding positions of digital watermark information (sub information) corresponding to the degrees of optical shielding from the second memory 505 (step S205).

After these pieces of information are acquired, the embedding position determination unit 506 determines the layout information of sub information indicating the embedding positions (regions) of the sub information (step S206). The embedding position determination unit 506 checks the degrees of optical shielding of respective regions based on the information acquired from the first memory 504. After the degrees of optical shielding of the respective regions are checked, the embedding position determination unit 506 checks the priority levels of the embedding positions (those of respective regions) corresponding to the degrees of optical shielding of the respective regions based on the information acquired from the second memory 505.

After the priority levels of the respective regions are checked, the embedding position determination unit 506 determines the embedding regions of the sub information based on the priority levels of the respective regions. In this case, the embedding regions of the sub information are determined as layout information of the sub information in the region 102 (or main image information) where at least a composite image is to be printed.

After the embedding position determination unit 506 determines the layout information of the sub information (information indicating the embedding regions of the sub information), the composite image generation unit 507 executes processing for generating composite image information based on the main image information, sub information, key information, and layout information of sub information for the respective regions (step S207). The composite image generation unit 507 determines the embedding regions of sub information in the main image information by associating the main image information with the layout information of the sub information determined by the embedding position determination unit 506. After the embedding regions of the sub information in the main image information are determined, the composite image generation unit 507 embeds the sub information into the embedding regions of the sub information in the main image information using the key information.

In this way, the composite image generation unit 507 generates composite image information obtained by embedding the sub information at the embedding positions corresponding to the degrees of optical shielding of the protection layer 202 in the ID card to be prepared. The composite image information generated by the composite image generation unit 507 is output to the print data generation unit 508.

The print data generation unit 508 which receives the composite image information from the composite image generation unit 507 generates print data to be printed on a recording medium as the ID card based on that composite image information and print information other than the composite image information (step S208). The print data generated by the print data generation unit 508 is output to the print unit 509.

The print unit 509 which receives the print data from the print data generation unit 508 prints the print data on the recording layer 203 of the recording medium used as the ID card (step S209). The recording medium on the recording layer 203 of which the print data is printed by the print unit 509 is supplied to the protection layer forming unit 510.

The protection layer forming unit 510 which receives the recording medium on the recording layer 203 of which the print data is printed from the print unit 509 forms the protection layer 202 made up of a protection material including OVDs at predetermined positions on the recording layer 203 of the recording medium (step S210).

As described above, according to the second embodiment, the embedding positions (regions) where sub information is to be embedded in a main image to be printed on the recording layer are determined on the basis of the degrees of optical shielding with respect to the surface of the recording layer based on the protection layer or security layer to be formed on the recording layer on which an image is printed in the recording medium. A composite image obtained by embedding the sub information at the embedding positions of sub information in the main image is generated as an image to be printed on the recording layer of the recording medium.

In this manner, even in the state in which composite image formed by embedding sub information into a main image is printed on the recording medium, the sub information embedded in the composite image can be stably reconstructed.

Furthermore, according to the second embodiment, the first memory stores information indicating the degrees of optical shielding of respective regions on the surface of the recording layer, and the second memory stores information indicating the priority levels of the embedding positions corresponding to the degrees of optical shielding in the second memory. Based on the information stored in the first and second memories, the embedding regions of sub information in a main image are determined, and a composite image obtained by embedding the sub information into embedding region of the sub information in the main image is generated as an image to be printed on the recording layer of the recording medium.

In this way, the sub information can be embedded into the main image at optimal embedding strengths. As a result, a composite image embedded with the sub information which can be reconstructed stably can be generated.

The second embodiment allows modifications (1) and (2) as follows.

(1) When a plurality of pieces of digital watermark information are to be embedded, the embedding regions of respective pieces of digital watermark information are determined on the basis of the importance levels of the respective pieces of digital watermark information and the degrees of optical shielding.

In general, in a composite image to be printed on an ID card or the like, a plurality of pieces of information are often embedded in a main image as digital watermark information. For example, as a plurality of pieces of digital watermark information, various kinds of information such as information for personal authentication, a company name, a logo mark of an organization, and the like can be used. These pieces of digital watermark information (authentication data) can be classified into relatively important information and not so important information. For example, the information for personal authentication is often more important than the company name, logo mark of the organization, or the like.

Hence, as a modification of the second embodiment, digital watermark information with a high importance level may be preferentially laid out in a region with a low degree of optical shielding (a region with a high priority level of the embedding position), and digital watermark information with a relatively low importance level may be laid out in a region with a high degree of optical shielding (a region with a low priority level of the embedding position).

In this case, the embedding position determination unit 506 acquires information indicating the importance levels of respective pieces of digital watermark information in addition to the information stored in the first and second memories 504 and 505. Note that the information indicating the importance levels of respective pieces of digital watermark information may be acquired by the digital watermark information acquisition unit 502 or may be stored in a third memory (not shown).

After the information indicating the importance levels of respective pieces of digital watermark information is acquired, the embedding position determination unit 506 assigns respective pieces of digital watermark information with higher importance levels to regions with lower degrees of optical shielding (regions with higher priority levels of the embedding positions). In this way, the embedding position determination unit 506 preferentially lays out respective pieces of digital watermark information to the regions with lower degrees of optical shielding (regions with higher priority levels of the embedding positions) in descending order of importance level.

In modification (1) of the second embodiment, the digital watermark information with a high importance level can be preferentially embedded in the region with a low degree of optical shielding (the region with a high priority level of the embedding position), thus increasing the reconstruction ratio of the digital watermark information with a high importance level.

(2) At least a part of digital watermark information is embedded to be visible to the human eye.

Some digital watermark techniques embed digital watermark information to be seen by a person (in a visible state). For example, a reference "proposal of signature watermarking method that positively indicates copyright, National Defense Academy in Japan, Journal of IIEEJ, Vol. 27, No. 5, pp. 507 to 512" proposes a technique for embedding digital watermark information to be visible to the human eye.

When such technique is applied to the second embodiment, i.e., when at least a part of digital watermark information is to be embedded in a visible state, digital watermark information to be embedded in a visible state may be embedded in a region with a high degree of optical shielding (a region with a low priority level of the embedding position). In this case, the embedding position determination unit 506 acquires information indicating whether to embed each digital watermark information in a visible or invisible state, in addition to the information stored in the first and second memories 504 and 505. Note that the information indicating whether to embed each digital watermark information in a visible or invisible state may be acquired by the digital watermark information acquisition unit 502 or may be stored in a third memory (not shown).

After the information indicating whether to embed each digital watermark information in a visible or invisible state is acquired, the embedding position determination unit 506 assigns digital watermark information to be embedded in a visible state to a region with a high degree of optical shielding (a region with a low priority level of the embedding position). In this way, the embedding position determination unit 506 lays out digital watermark information to be embedded in a visible state in the region with a high degree of optical shielding (the region with a low priority level of the embedding position). If the degree of optical shielding is too high, even digital watermark information embedded in a visible state cannot be visually recognized. For this reason, digital watermark information to be embedded in a visible state may be assigned to a region with a predetermined degree of optical shielding (priority level of the embedding position).

In modification (2) of the second embodiment, digital watermark information can be embedded in a visible state in a region with a high degree of optical shielding (a region with a low priority level of the embedding position), and at least a part of the digital watermark information can be positively set in a visible state. In this way, counterfeiting or corruption can be suppressed, and the ID card can be hardly counterfeited or corrupted.

That is, the ID card on which an image whose digital watermark information is positively visible is printed can appeal application of the technique that prevents counterfeiting or corruption, thus aiming at the effect of suppressing counterfeiting or corruption. Also, the region with a high degree of optical shielding is a region from which an image on the recording layer 203 is hardly scanned, as described above. In other words, the region with a high degree of optical shielding is a region which is hardly counterfeited or corrupted. At the same time, since digital watermark information embedded in a visible state is visible to the human eye, it need not be reconstructed from an image scanned by the optical scanning device. Therefore, by embedding the digital watermark information in a visible state, which need not be reconstructed, in the region with a high degree of optical shielding, which is hardly counterfeited or corrupted, counterfeiting or corruption of the ID card can be prevented.

Note that recording media to which the first and second embodiments are applied are not limited to card-like recording media. The first and second embodiments can be applied to storage media as long as they have a print surface on which a composite image obtained by embedding digital watermark information (sub information) into a main image is printed. For example, the first or second embodiment can be applied to booklet-type recording media such as an account book, passport, pension book, and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for generating an image to be printed on a recording medium, comprising:

a determination unit configured to determine an embedding position of respective pieces of a plurality of sub information into a main image to be printed on a print surface;

an image processing unit configured to generate a composite image obtained by embedding respective pieces of the sub information into the main image by the embedding position determined by the determination unit;

a first memory configured to store first information indicating a degree of optical shielding of each of a plurality of regions of a protection layer formed on the print surface of the recording medium;

a second memory configured to store second information indicating a priority level of the embedding position of the sub information corresponding to the degree of optical shielding; and a third memory configured to store third information indicating importance levels of the respective pieces of the sub information, wherein the determination unit determines the embedding position of the respective pieces of the sub information based on:

the first information indicating the degree of optical shielding of each of the plurality of regions of the protection layer, the second information indicating the priority level of the embedding position of the sub information corresponding to the degree of optical shielding, and the third information indicating importance levels of the respective pieces of the sub information such that the pieces of the sub information with higher importance levels are assigned to regions with lower degrees of optical shielding and the pieces of the sub information with lower importance levels are assigned to regions with higher degrees of optical shielding.

2. An apparatus according to claim 1, which further comprises:
a print unit which prints the composite image generated by the image processing unit on the print surface of the recording medium.

3. An apparatus according to claim 2, which further comprises:
a layer forming unit which forms a layer, which exhibits the degree of optical shielding, on the print surface on which the composite image is printed by the print unit.

4. An image processing method for generating an image to be printed on a recording medium, comprising:
   determining an embedding position of respective pieces of a plurality of sub information into a main image to be printed on a print surface;
   generating a composite image obtained by embedding the respective pieces of the sub information into the main image by the determined embedding position;
   storing, in a first memory, first information indicating a degree of optical shielding of each of a plurality of regions of a protection layer formed on the print surface of the recording medium;
   storing, in a second memory, second information indicating a priority level of the embedding position of the sub information corresponding to the degree of optical shielding; and
   storing, in a third memory, third information indicating importance levels of the respective pieces of the sub information,
   wherein the determination unit determines the embedding position of the respective pieces of the sub information based on:
      the first information indicating the degree of optical shielding of each of the
   plurality of regions of the protection layer,
      the second information indicating the priority level of the embedding
   position of the sub information corresponding to the degree of optical shielding, and
      the third information indicating importance levels of the respective pieces of the sub information such that the pieces of the sub information with higher importance levels are assigned to regions with lower degrees of optical shielding and the pieces of the sub information with lower importance levels are assigned to regions with higher degrees of optical shielding.

5. The image processing method of claim 4, further comprising forming a layer, which exhibits the degree of optical shielding, on the print surface on which the composite image is printed.

6. A print product prepared by using the image processing method of claim 4.

* * * * *